UNITED STATES PATENT OFFICE.

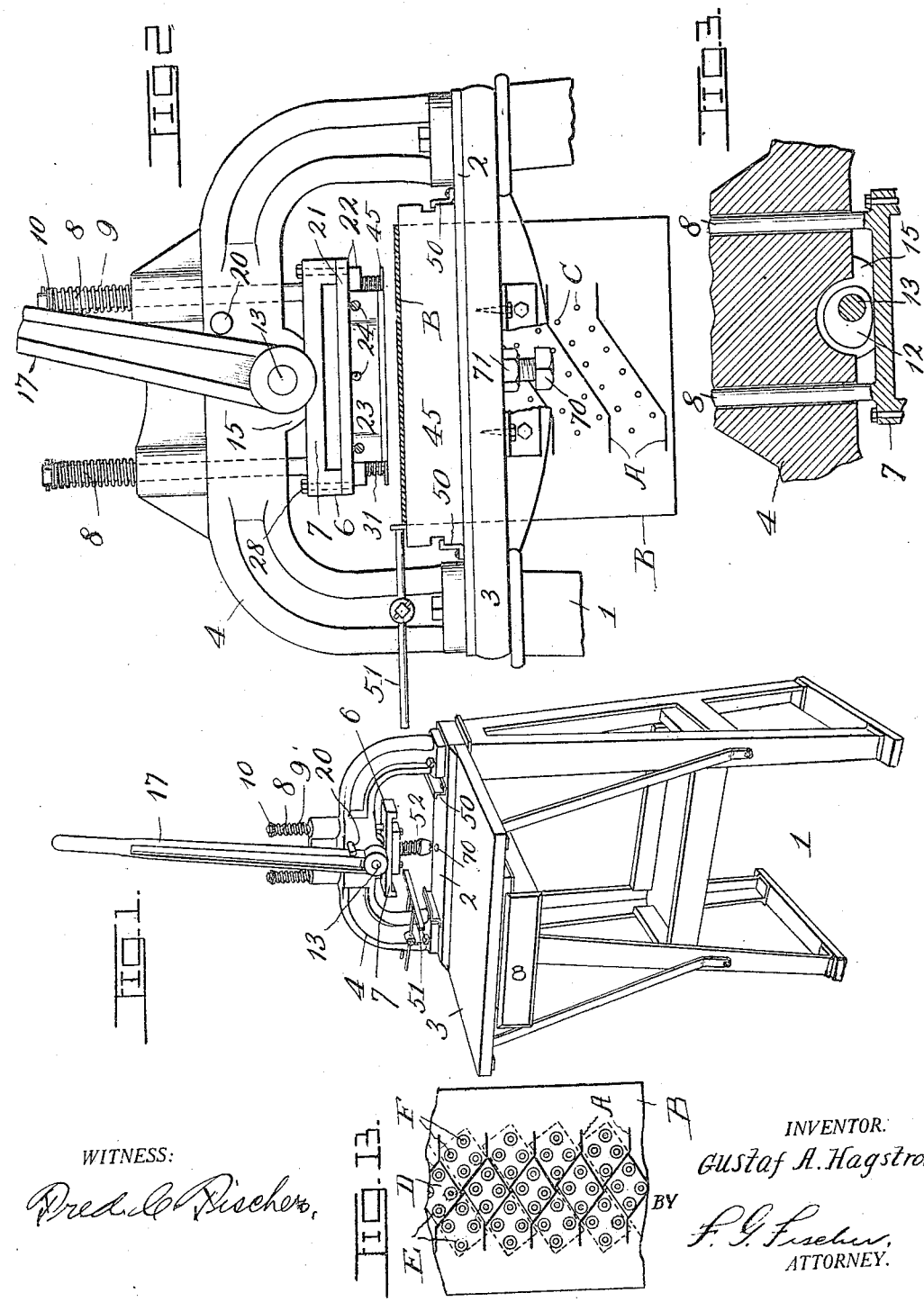

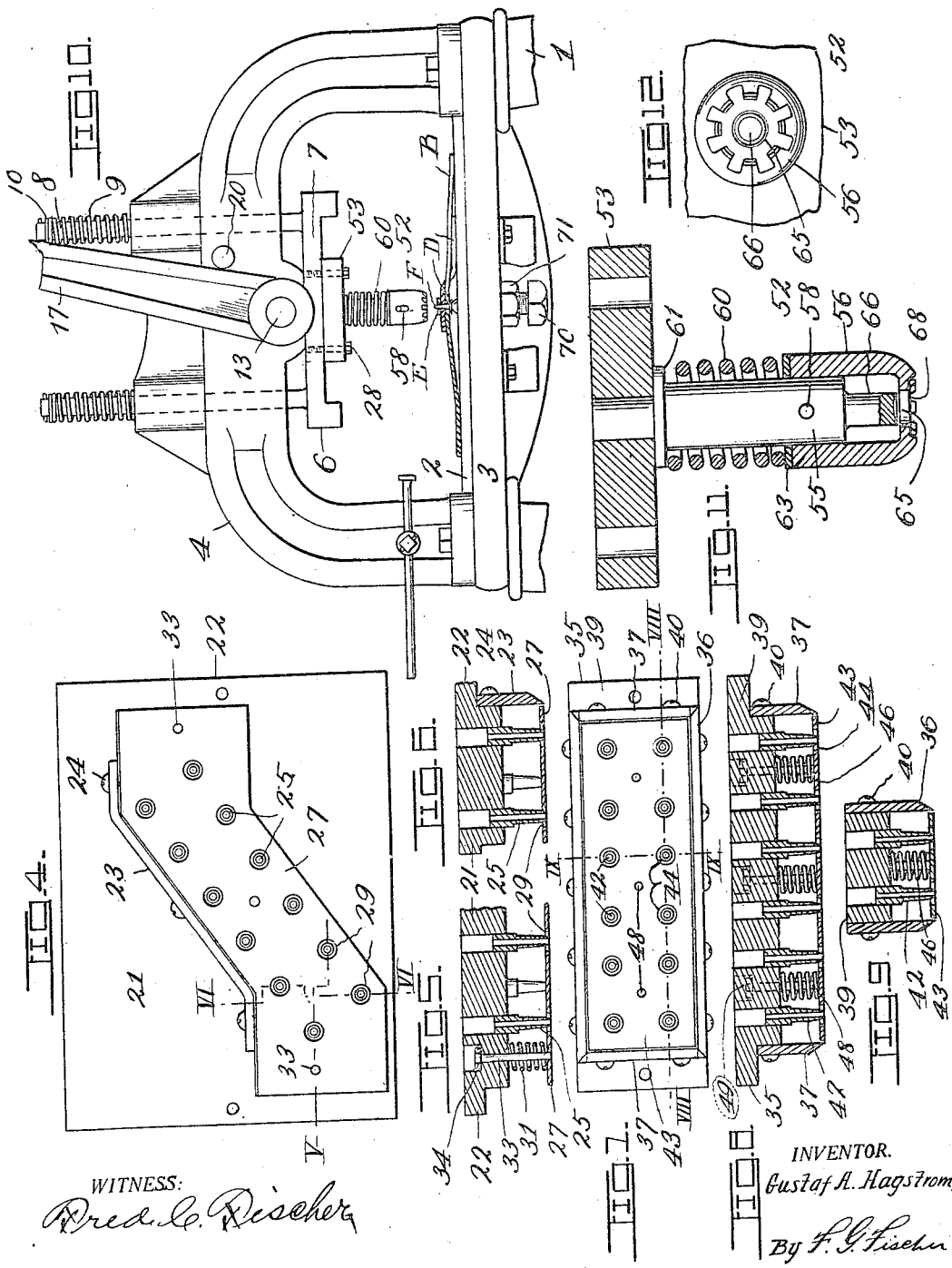

GUSTAF A. HAGSTROM, OF KANSAS CITY, MISSOURI.

TIRE-TREAD-MAKING MACHINE.

1,260,191.　　　　　Specification of Letters Patent.　　Patented Mar. 19, 1918.

Application filed May 21, 1917. Serial No. 170,057.

*To all whom it may concern:*

Be it known that I, GUSTAF A. HAGSTROM, a citizen of the United States, residing at Kansas City, in the county of Jackson and State of Missouri, have invented certain new and useful Improvements in Tire-Tread-Making Machines, of which the following is a specification.

My invention relates to tire tread making machines and my object is to provide a comparatively simple, inexpensive, and efficient machine of this character whereby tire treads can be expeditiously manufactured at a minimum of labor and cost.

Other objects of the invention will hereinafter appear, and in order that said invention may be fully understood, reference will now be made to the accompanying drawings, in which:

Figure 1 is a perspective view of the machine ready for riveting the tire tread.

Fig. 2 is an enlarged, broken front elevation of the machine adjusted for slitting and punching the material from which the tire tread is formed.

Fig. 3 is a vertical section of a tool holder, its support, and a cam for actuating said tool holder.

Fig. 4 is an inverted plan view of a knife and punches for slitting the tire tread and punching rivet holes therein, respectively.

Fig. 5 is an irregular, broken, longitudinal section, taken on line V of Fig. 4.

Fig. 6 is an irregular broken cross section taken on line VI—VI of Fig. 4.

Fig. 7 is an inverted plan view of knives for cutting out rectangular strips to form part of the tread, and punches for punching rivet holes in said strips.

Fig. 8 is a longitudinal section on line VIII—VIII of Fig. 7.

Fig. 9 is a cross section on line IX—IX of Fig. 7.

Fig. 10 is a view similar to Fig. 2, with the riveting die substituted for the slitting knife and punches.

Fig. 11 is an enlarged, vertical section of a riveting die employed in carrying out the invention.

Fig. 12 is a broken inverted plan view of the riveting die.

Fig. 13 is a reduced broken plan view of a portion of the completed tire tread.

In carrying out the invention, I employ a substantial stand 1 having a metal table 2 and a wooden table 3.

4 designates a yoke rigidly mounted upon the metal table 2 and operably-supporting a tool holder 6, consisting of a plate 7 and a pair of upwardly-extending guide rods 8, slidably-mounted in the yoke. Coil springs 9 interposed between the top of the yoke and washers 10 on the guide rods, normally hold the tool holder 6 in raised position, as disclosed by the drawings.

12 designates a cam to force the tool holder 6 downwardly. Said cam is fixed upon a shaft 13, journaled in bearings 15 on the central portion of the yoke. A lever 17 is fixed to one end of the shaft 13 to rotate the same and the cam. A stop 20, projecting from the yoke 4, serves to limit the movement of the lever 17 in one direction.

The tool holder 6 is adapted to hold the different tools employed in slitting, punching, and riveting the tire tread. One of said tools 21, comprises a plate 22, a blade 23 removably-fixed to one side of said plate 22 by screws 24, tubular punches 25 fixed in the under portion of the plate 22, and a stripper 27. Bolts 28 removably-secure the tool 21 to the tool holder 6.

As disclosed by Fig. 4, the blade 23 is of irregular shape and successively cuts corresponding slits A in the tire tread B, which is of leather or other suitable material. The tubular punches 25 are spaced apart and punch the rivet holes C in the material between the slits A. The stripper 27 has holes 29, through which the lower ends of the punches extend. Spring 31, yieldingly-hold the stripper down on a level with the lower ends of the punches. Said stripper 27 is prevented from being forced below the lower edges of the punches 25, by bolts 33 fixedly-secured to said stripper and slidably-mounted in the plate 22, where they are provided with nuts 34.

35 designates a tool for cutting out oblong straps D, which extend through the slits A and are riveted to the tread B to form a part thereof. Said tool 35 is somewhat similar in construction to the tool 22, excepting that a plurality of straight blades are employed and comprise two longitudinal blades 36 and two transverse blades 37, arranged in oblong form and removably-secured to a plate 39 by screws 40.

Tubular punches 42 project downwardly from the plate 39, and a stripper 43, with holes 44 for the passage of the lower ends of the punches 43, is held downwardly on a level with said punches by coil springs 46. Downward movement of the stripper 43 is limited by bolts 48, fixedly-secured thereto and slidingly mounted in the plate 22 where they are provided with nuts 49.

To prevent damage to the sharp edges of the knives, a wooden block 45 is placed upon the table to support the tread B, said block 45 being held in place by clamps 50, secured to the top of the table. An adjustable gage 51, slidable through lugs on the yoke 4, rests upon the block 45 to engage one edge of the tire tread B, so that the same may be positioned properly beneath any of the tools.

52 designates a die adapted to be substituted for either of the tools 22, 35, for the purpose of riveting straps D to the main portion of the tire tread B. Said die 52 comprises a plate 53 adapted to be secured to the underside of the tool holder 6 by the bolts 28, a punch 55 rigidly secured to said plate 53, and a tubular member 56 slidably mounted on the lower portion of the punch 55. Independent movement of the member 56 upon the punch 55 is restricted by a pin-and-slot connection 58.

A coil spring 60 is interposed between a shoulder 61 on the punch 55 and a washer 63 on the tubular member 56, to normally hold the latter at the end of its downward movement. The lower end of the tubular member 56 has a central hole 65 for the passage of the reduced lower terminal 66 of the punch. Said lower end also has a seat 68 for the washers E, over which the rivets F are crimped. Said rivets F are successively placed upon a support 70, threaded through the central portion of the table 2 and provided with a lock nut 71, for securing it in any of its adjusted positions.

In practice the slits A and rivet holes C are first formed in the tread B by the tool 22, which is forced downwardly with the tool holder 6 through the intermediacy of the cam 12 and the lever 17. On reaching the top of the tread the stripper 27 stops while the blade 23 and the punches 25, pass through said tread. After the slits A and the rivet holes C have been formed in the tread B, the tool holder 6 and its parts are raised to normal position by the springs 9. As the blade and the punches pass upward the tread B is forced therefrom by the stripper 27. The next operation is the application of the straps D, which may be cut and punched with the tool 35, previously, or subsequently, as desired, to slitting and punching the tread B. In order to secure said straps to the tread the die 52 is substituted for either of the tools 22, 35. The wooden block 48 is removed and the rivet support 70 is adjusted upwardly, so that its upper end will project slightly above the surface of the metal table 2. The rivets F, which have been previously placed through the punched holes in the main portion of the tread B and the straps D, are successively placed in position upon the support 70, and a washer E is placed over each. The die 52 is then forced downwardly through the intermediacy of the lever 17 and the cam 12, whereupon the tubular member 56 seats itself over the washer to prevent it from moving laterally while the punch 66 continues downwardly and crimps the upper end of the rivet over said washer. The marginal recesses in the lower portion of the tubular member 56, permit the operator to observe whether or not the rivet and its washer are in axial alinement with the die before the same is forced downwardly to the end of its stroke. As may be observed by referring to Fig. 11, the side walls of the seat 68 diverge downwardly and thus tend to center the rivet in case it is not properly placed in exact alinement with the axis of the die.

From the foregoing description it is apparent that I have produced a machine embodying the features of advantage above enumerated, and while I have shown and described the preferred form of my invention, I reserve the right to make such changes in the construction, proportion, and arrangement of parts as properly fall within the spirit and scope of the claims.

Having thus described my invention, what I claim and desire to secure by Letters Patent, is:

1. In a machine of the type set forth, a table, a yoke supported at its ends in overlying relation to the table, bearings on the opposite sides of the yoke depending from the longitudinal center thereof, said yoke on its under side having a cut-out between the bearings, a shaft journaled in said bearings, a cam on the shaft operating in said cut-out of the yoke, said yoke having vertical guide openings therein located at diametrically opposite points on the sides of the shaft, guide rods in said guide openings, springs encircling the guide rods and connected thereto and bearing against the upper side of the yoke, a plate connected to the guide rods and having its top formed to engage the cam, and means connected to an end of the shaft and movable beyond one of the side faces of the yoke to operate said cam, said bearings being also engageable with the top of the plate to limit the upward movement of the plate.

2. In a machine of the type set forth, a table, a yoke carried by the table and having an opening in its under face, a shaft, a cam on the shaft, means to mount the shaft so that the cam operates in said opening of the yoke, said yoke having vertical guide openings therein located at diametrically opposite points on the sides of the shaft, guide rods in said guide openings, springs connected to the guide rods and to the yoke to normally move the rods upwardly, a plate connected to the lower ends of the rods and operating below the bottom face of the yoke and having its upper face engaged with the cam, and means to actuate the shaft connected to an end thereof and movable beyond one of the side faces of the yoke.

3. In a machine of the type set forth, a table, a yoke thereon, a work supporting block on the table, a tool holder borne by the yoke, means to operate the tool holder, a gage arranged above the block and including an arm extending across the inner side of one leg of the yoke, a pair of spaced arms connected to the first named arm and straddling said leg of the yoke, and means to secure the respective pair of arms to the opposite sides of said leg of the yoke.

In testimony whereof I affix my signature, in the presence of two witnesses.

GUSTAF A. HAGSTROM.

Witnesses:
F. G. FISCHER,
L. J. FISCHER.

Copies of this patent may be obtained for five cents each, by addressing the "Commissioner of Patents, Washington, D. C."